United States Patent
Liu et al.

(10) Patent No.: US 9,214,752 B2
(45) Date of Patent: Dec. 15, 2015

(54) BUS BAR MODULE

(71) Applicant: YAZAKI CORPORATION, Minato-ku, Tokyo (JP)

(72) Inventors: Haifeng Liu, Kakegawa (JP); Yukihisa Kikuchi, Kakegawa (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/589,088

(22) Filed: Jan. 5, 2015

(65) Prior Publication Data

US 2015/0118875 A1    Apr. 30, 2015

Related U.S. Application Data (63) Continuation of application No. PCT/JP2013/068648, filed on Jul. 8, 2013.

(30) Foreign Application Priority Data

Jul. 9, 2012  (JP) ................................. 2012-153266

(51) Int. Cl.
  *H01R 13/447*  (2006.01)
  *H01M 2/20*  (2006.01)
  *H01R 25/16*  (2006.01)

(52) U.S. Cl.
  CPC ............. *H01R 13/447* (2013.01); *H01M 2/202* (2013.01); *H01R 25/16* (2013.01)

(58) Field of Classification Search
  CPC ...... H01R 13/447; H01R 25/16; H01M 2/202
  See application file for complete search history.

(56) References Cited

U.S. PATENT DOCUMENTS

| | | | | |
|---|---|---|---|---|
| 6,896,995 B2* | 5/2005 | Saito | ................. | H01M 2/1077 429/158 |
| 7,077,704 B2* | 7/2006 | Ikeda | ................. | H01M 2/206 439/251 |
| 7,229,320 B2* | 6/2007 | Saito | ................. | H01R 11/26 439/627 |
| 7,488,201 B2* | 2/2009 | Yoon | ................. | H01M 2/202 439/213 |
| 7,754,374 B2* | 7/2010 | Hashida | ................. | H01R 13/5213 429/151 |
| 8,449,333 B2* | 5/2013 | Ikeda | ................. | H01M 2/1061 439/627 |

(Continued)

FOREIGN PATENT DOCUMENTS

| | | |
|---|---|---|
| JP | 2000-149909 A | 5/2000 |
| JP | 2006-269103 A | 10/2006 |

(Continued)

*Primary Examiner* — Ross Gushi
(74) *Attorney, Agent, or Firm* — Marvin A. Motsenbocker; Mots Law, PLLC (57) ABSTRACT

A bus bar module includes: a bus bar module body section formed of an insulating material, and including an output terminal installation section on which to install an output terminal, a part of the output terminal installation section projecting, and a cover latching section provided to a tip end side of the projecting output terminal installation section; and an output terminal cover configured to cover the output terminal on the output terminal installation section, provided to the bus bar module body section using a hinge section which is provided to a base end side of the output terminal installation section, and including a cover latch section provided to a tip end side of the output terminal cover, the cover latch section being fastened to the cover latching section of the bus bar module body section when the output terminal cover covers the output terminal on the output terminal installation section.

4 Claims, 11 Drawing Sheets

(56) References Cited

U.S. PATENT DOCUMENTS

| | | | | |
|---|---|---|---|---|
| 8,492,024 B2* | 7/2013 | Ogasawara | ............ | H01M 2/206 429/121 |
| 8,563,161 B2* | 10/2013 | Ogasawara | ......... | H01M 2/1072 429/121 |
| 8,574,003 B2* | 11/2013 | Ikeda | .................... | H01M 2/206 439/500 |
| 8,623,544 B2* | 1/2014 | Tsuchiya | .............. | H01M 2/202 429/163 |
| 8,748,021 B2* | 6/2014 | Lim | ........................ | H01M 2/12 429/163 |
| 8,758,915 B2* | 6/2014 | Matsunaga | .......... | G01D 11/245 429/175 |
| 8,765,289 B2* | 7/2014 | Ikeda | .................. | H01M 2/1077 429/149 |
| 8,802,277 B2* | 8/2014 | Tsuchiya | .............. | H01M 2/202 429/178 |
| 8,858,244 B2* | 10/2014 | Ogasawara | ............. | H01M 2/34 439/135 |
| 8,859,134 B2* | 10/2014 | Ikeda | .................. | H01M 2/1077 429/158 |
| 9,023,499 B2* | 5/2015 | Takase | ................ | H01M 2/1077 429/90 |
| 9,039,454 B2* | 5/2015 | Ogasawara | ............ | H01R 9/226 439/500 |
| 9,099,821 B2* | 8/2015 | Ikeda | .................... | H01M 2/206 1/1 |
| 9,150,115 B2* | 10/2015 | Ikeda | .................. | B60L 11/1879 1/1 |
| 2001/0044241 A1* | 11/2001 | Saito | .................... | H01M 2/206 439/736 |
| 2001/0046816 A1* | 11/2001 | Saito | .................... | H01M 2/206 439/736 |
| 2005/0242917 A1* | 11/2005 | Higuchi | ............... | H01H 85/044 337/180 |
| 2008/0199765 A1* | 8/2008 | Yoon | .................. | H01M 2/1072 429/91 |
| 2009/0130904 A1* | 5/2009 | Bonfils | .................. | H01R 13/53 439/607.58 |
| 2011/0045329 A1* | 2/2011 | Ikeda | .................... | H01M 2/206 429/91 |
| 2011/0104556 A1* | 5/2011 | Kim | .................... | H01M 2/1077 429/160 |
| 2012/0015550 A1* | 1/2012 | Ikeda | .................. | H01M 2/1077 439/391 |
| 2012/0114991 A1* | 5/2012 | Park | .................... | H01M 2/1077 429/82 |
| 2012/0164509 A1* | 6/2012 | Ogasawara | ............ | H01R 9/226 429/121 |
| 2012/0183833 A1* | 7/2012 | Ikeda | .................. | H01M 2/1077 429/121 |
| 2012/0244403 A1* | 9/2012 | Maskew | .................. | B60K 6/28 429/99 |
| 2012/0306474 A1* | 12/2012 | Ikeda | .................. | H01M 2/1077 324/72 |
| 2013/0052516 A1* | 2/2013 | Kim | .................... | H01M 2/1016 429/159 |
| 2013/0071721 A1* | 3/2013 | Ogasawara | ......... | H01M 2/1077 429/151 |
| 2013/0178091 A1* | 7/2013 | Ogasawara | ............ | H01R 9/226 439/366 |
| 2014/0017553 A1* | 1/2014 | Kikuchi | ................ | H01M 2/206 429/159 |
| 2014/0308560 A1* | 10/2014 | Takishita | .............. | H01M 2/206 429/121 |
| 2014/0311768 A1* | 10/2014 | Takishita | ................ | H01M 2/34 174/66 |
| 2014/0363711 A1* | 12/2014 | Zhao | .................... | H01M 10/486 429/90 |
| 2015/0118875 A1* | 4/2015 | Liu | ........................ | H01M 2/202 439/142 |
| 2015/0125727 A1* | 5/2015 | Lui | ........................ | H01M 2/206 429/90 |
| 2015/0140392 A1* | 5/2015 | Liu | ........................ | H01M 2/204 429/121 |
| 2015/0171403 A1* | 6/2015 | Liu | ........................ | H01M 2/206 429/121 |
| 2015/0180005 A1* | 6/2015 | Liu | ........................ | H01M 2/206 439/142 |

FOREIGN PATENT DOCUMENTS

| | | |
|---|---|---|
| JP | 2006-269104 A | 10/2006 |
| JP | 2013-016381 A | 1/2013 |
| WO | 2011-135954 A1 | 11/2011 |

* cited by examiner

BUS BAR MODULE

CROSS REFERENCE TO RELATED APPLICATIONS

This application is a continuation application of International Application No. PCT/JP2013/068648, filed on Jul. 8, 2013, which claims priority to Japanese Patent Application No. 2012-153266, filed on Jul. 9, 2012, the entire contents of which are incorporated by references herein.

BACKGROUND OF THE INVENTION

1. Field of the Invention

The present invention relates to a bus bar module, and particularly to one provided with an output terminal cover which is configured to cover an output terminal and is capable of freely turning on a hinge section.

2. Description of the Related Art

A bus bar module 303 has heretofore been known which, as shown in FIGS. 11 to 14, includes an output terminal cover 301 (see Japanese Patent Application Publication No. 2006-269103).

The bus bar module 303 has a structure in which: a case 305 is provided with a positioning section 307 and a latch section 309; and an output terminal cover 301 is provided with an engagement section slit hole 311 and a cover latching claw 313.

Furthermore, even if the case 305 and the output terminal cover 301 are somewhat displaced from each other, the cover latching claw 313 securely fits into the latch section 309 of the case 305 when the output terminal cover 301 is closed, because the positioning section 307 of the case 305 comes into contact with the engagement section slit hole 311 of the output terminal cover 301 in the first place.

SUMMARY OF THE INVENTION

Meanwhile, in the conventional bus bar module 303, the latch section 309 and the cover latching claw 313 are located at the same height as is a hinge section for the output terminal cover 301 (for example, in the case where the output terminal cover 301 is shaped like a rectangular box, the hinge section is provided along one side of an opening of the output terminal cover 301, and the latch section 309 and the cover latching claw 313 are located along an opposite side of the opening from the one side.) As a consequence, the bus bar module 303 has a problem that it is difficult for an operator to open and close the output terminal cover 301 because the case 305 is prone to blocking the reach of the finger of the operator to the location of the latch section 309 and the cover latching claw 313.

The present invention has been made with the foregoing problem taken into consideration. An object of the present invention is to provide a bus bar module to be installed and used in a battery assembly for connecting batteries of the battery assembly in series, which allows an operator to easily reach a latch section of an output terminal cover and the like with the finger, and thus facilitates an operation to open and close the output terminal cover.

An aspect of the present invention provides a bus bar module installed and used in a battery assembly in order to connect batteries of the battery assembly in series. The bus bar module includes: a bus bar module body section formed of an insulating material, and including an output terminal installation section on which to install an output terminal, apart of the output terminal installation section projecting, and a cover latching section provided to a tip end side of the projecting output terminal installation section; and an output terminal cover configured to cover the output terminal installed on the output terminal installation section, provided to the bus bar module body section using a hinge section which is provided to a base end side of the output terminal installation section, and including a cover latch section provided to a tip end side of the output terminal cover, the cover latch section configured to be fastened to the cover latching section of the bus bar module body section when the output terminal cover covers the output terminal installed on the output terminal installation section.

The bus bar module may include a guide section configured to align the cover latch section of the output terminal cover with the cover latching section of the bus bar module body section when the cover latch section is fastened to the cover latching section.

The guide section may be formed from at least one of: a mode including a guide surface provided to the output terminal installation section, and a part of the output terminal cover configured to come into engagement with and slide over the guide surface; a mode including a recess provided to the bus bar module body section near the output terminal installation section, and a projection provided to the output terminal cover and configured to enter the recess; a mode including a projection provided to the bus bar module body section near the output terminal installation section, and a recess provided to the output terminal cover and configured to receive entry of the projection; and a mode including a pair of projections provided to the output terminal cover near the cover latching section, and a part of the output terminal installation section configured to be interposed between the pair of projections.

The output terminal cover may include: a bottom wall section shaped like a rectangular flat plate; a first side wall section shaped like a rectangular flat plate, and being orthogonal to the bottom wall section; a second side wall section shaped like a rectangular flat plate, and being orthogonal to the bottom wall section and the first side wall section; and a cover latch section forming section shaped like a plate, projecting from the farthest corner of the bottom wall section from the side wall sections, as well as from a vicinity of the corner, and including the cover latch section. The projecting part of the output terminal installation section may be shaped like a flat plate. The hinge section may be provided to one side of the first side wall section which is opposite from the bottom wall section. The output terminal installed on the output terminal installation section may be designed to be located inside an internal space defined by the output terminal cover and the projecting part of the output terminal installation section when the output terminal cover covers the output terminal installed on the output terminal installation section.

The present invention brings about an effect that a bus bar module to be installed and used in a battery assembly for connecting batteries of the battery assembly in series allows an operator to easily reach a latch section of an output terminal cover and the like with the finger, and thus facilitates an operation to open and close the output terminal cover.

BRIEF DESCRIPTION OF THE DRAWINGS

FIGS. 1A-1C include views showing a main part of a bus bar module (a bus bar module with a terminal cover opened) of an embodiment of the present invention, in which

FIGS. 5A-5C include views showing a different main part of the bus bar module (the bus bar module with the terminal cover opened) of the embodiment of the present invention, in which

FIGS. 10A-10D include diagrams schematically showing how to align the terminal cover of the bus bar module, in which FIGS. 10A and 10B are diagrams related to the embodiment of the present invention, while

DESCRIPTION OF THE PREFERRED EMBODIMENTS

Like conventional bus bar modules, a bus bar module (a battery connecting body) 1 of an embodiment of the present invention is installed and used in, for example, a side portion of a battery assembly (not illustrated in FIGS. 1A to 9) for the purpose of connecting batteries of the battery assembly in series.

Here, for the sake of explanatory convenience, one direction along the bus bar module 1 is defined as a lengthwise direction (an X-axis direction). One direction orthogonal to the lengthwise direction is defined as a vertical direction (a Y-axis direction). A direction orthogonal to the lengthwise and vertical directions is defined as a thickness direction (a Z-axis direction).

Each battery is shaped like an elongated rectangular parallelepiped, for example. A plus terminal and a minus terminal project from one surface of the battery in the lengthwise direction.

The battery assembly includes the multiple batteries (cells) formed in the same shape. In the battery assembly, the lengthwise directions of the respective batteries each coincide with one horizontal direction (the thickness direction of the bus bar module), and agree with one another. In the battery assembly, the surfaces of the respective batteries in the lengthwise direction (the surfaces of the respective batteries from which their plus and minus terminals project) are located on one plane, while the opposite surfaces of the respective batteries in the lengthwise direction are located on another plane. Furthermore, in the battery assembly, the batteries are arranged in the other horizontal direction orthogonal to the one horizontal direction (the lengthwise direction of the bus bar module) in a way that each two neighboring batteries are in contact with each other or with a slight space in between. Moreover, in the battery assembly, two or more tiers each consisting of the batteries arranged in the other horizontal direction are stacked one on another in an up-down direction (the vertical direction of the bus bar module) in a way that each two neighboring tiers are in contact with each other or with a slight space in between.

Thereby, when the battery assembly is viewed in the lengthwise directions of the batteries (from the side on which the plus terminals and the minus terminals project from the respective batteries), the multiple batteries are disposed in a matrix arrangement in the horizontal and up-down directions. Moreover, the plus terminals and the minus terminals of the respective batteries arranged in the other horizontal direction are disposed alternately.

The bus bar module 1 includes a bus bar module body section 3 and an output terminal cover (a hinge cover) 5, as shown in FIGS. 1A to 4.

The bus bar module body section 3 is formed of an insulating material (formed of an insulating synthetic resin by injection molding, for example). In addition, parts of output terminal installation sections (output terminal supporting sections) 9 on which to install output terminals 7, respectively, are projectingly provided to the bus bar module body section 3. A cover latching section 11 is provided on a tip-end side of each projecting output terminal installation section 9.

Multiple metal-made bus bars 13 each made of a metal and shaped like a flat plate are integrally installed on the bus bar module body section 3 in a fitted or the like manner. In addition, each output terminal 7 is integrally installed on the bus bar module body section 3 in a way that the output terminal 7 is fitted to the bus bar module body section 3 (the output terminal installation section 9) or in the like manner.

The bus bar module 1 is produced by installing the bus bars 13, the output terminals 7 and the like on the bus bar module body section 3.

When the bus bar module 1 is installed in the battery assembly, the batteries of the battery assembly are connected in series in a way that the bus bars 13 installed on the bus bar module body section 3 (the installed bus bars 13) are respectively connected to the terminals of the batteries.

Each output terminal 7 is made of a conductive metal material. When the bus bar module 1 is installed in the battery assembly, each output terminal 7 comes into engagement with, and establishes electrical conduction with, a terminal (an electrode) of a corresponding endmost one of the batteries connected in series by the bus bars 13.

The bus bar module body section 3 includes: a part (a base board part) 17 provided with bus bar installation sections 15, and shaped almost like a rectangular flat plate; and projections 19 respectively projecting from ends of the base board part 17 in the thickness direction of the base board part 17, and each shaped like a flat plate. Each output terminal installation section 9 is formed from: the corresponding projection 19; and a portion of the base board part 17 near the projection 19. The cover latching section 11 is provided in a tip end-side portion of each projection 19.

When the bus bar module 1 is installed in the battery assembly, the base board part 17 is installed on the side surface of the battery assembly from which the plus and minus terminals project. At this time, the thickness direction of the flat plate-shaped base board part 17 of the bus bar module 1 is orthogonal to the side surface of the battery assembly. Each projection 19 projects from the base board part 17 in a direction orthogonal to the side surface of the battery assembly, and in a way that the projection 19 becomes farther from the battery assembly.

Each output terminal cover 5 insulates and protects the corresponding output terminal 7, which is installed on the corresponding output terminal installation section 9 and projects together with the output terminal installation section 9, by covering the output terminal 7. Each output terminal cover 5 is provided to the bus bar module body section 3 with the assistance of a hinge section (for example, a hinge section formed from a self-hinge which is thinner than any other section) 21 provided on a base end-side portion of the projecting output terminal installation section 9 (the projection 19). Incidentally, each output terminal cover 5 and the corresponding hinge section 21 are molded integrally with the bus bar module body section 3.

The output terminal cover 5 is provided with a cover latch section 23 which is fastened to the cover latching section 11 of the bus bar module body section 3 (the projection 19) when the output terminal cover 5 covers the output terminal 7 installed on the output terminal installation section 9. The cover latch section 23 is provided to a tip end of the output terminal installation section 9 (the projection 19) which is apart and opposite from the hinge section 21.

To put it in more detail, in each end of the base board part 17 of the bus bar module body section 3 (for example, each end in the lengthwise direction), the hinge section 21 is provided to an end, a base end portion, of the projection 19. The cover latching section 11 is provided to the tip end portion of the projection 19 on a side opposite from the hinge section 21 across the center of the projection 19.

The output terminal cover 5 includes a member obtained by bending a material, shaped like a rectangular plate, into the form of the letter "L." The hinge section 21 is located at one end of the L-shaped member, while the cover latch section 23 is located at the opposite end of the L-shaped member.

When the output terminal cover 5 turns pivotally on the hinge section 21, for example, by 180 degrees, the output terminal cover 5 turns between a position (a covering position, see FIG. 4) at which the output terminal cover 5 covers the output terminal (the installed output terminal) 7 installed on the output terminal installation section 9 of the bus bar module body section 3 and a position (an uncovering position, see FIGS. 1A to 3) at which the installed output terminal 7 is uncovered in a way that the installed output terminal 7 is exposed to the outside.

The cover latching section 11 of the bus bar module body section 3 is formed from, for example, a projection 25 provided on the tip end-side portion of the projection 19. The cover latch section 23 of the output terminal cover 5 is formed from, for example, a through-hole 27.

Meanwhile, when the output terminal cover 5 is located in the covering position, the cover latch section 23 of the output terminal cover 5 is fastened to the cover latching section 11 of the bus bar module body section 3 with the projection 25 of the cover latching section 11 entering the through-hole 27 of the cover latch section 23.

The bus bar module 1 is further provided with guide sections 29. Each guide section 29 aligns the cover latch section 23 of the output terminal cover 5 with the cover latching section 11 of the bus bar module body section 3, when the cover latch section 23 is fastened to the cover latching section 11.

Figure 1A:
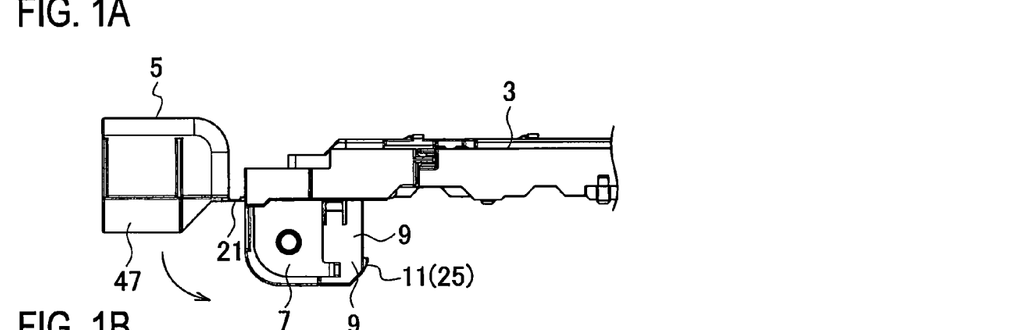
FIG. 1A is a view of the main part viewed in a IA arrow direction of FIG. 1B.
Figure 1B:
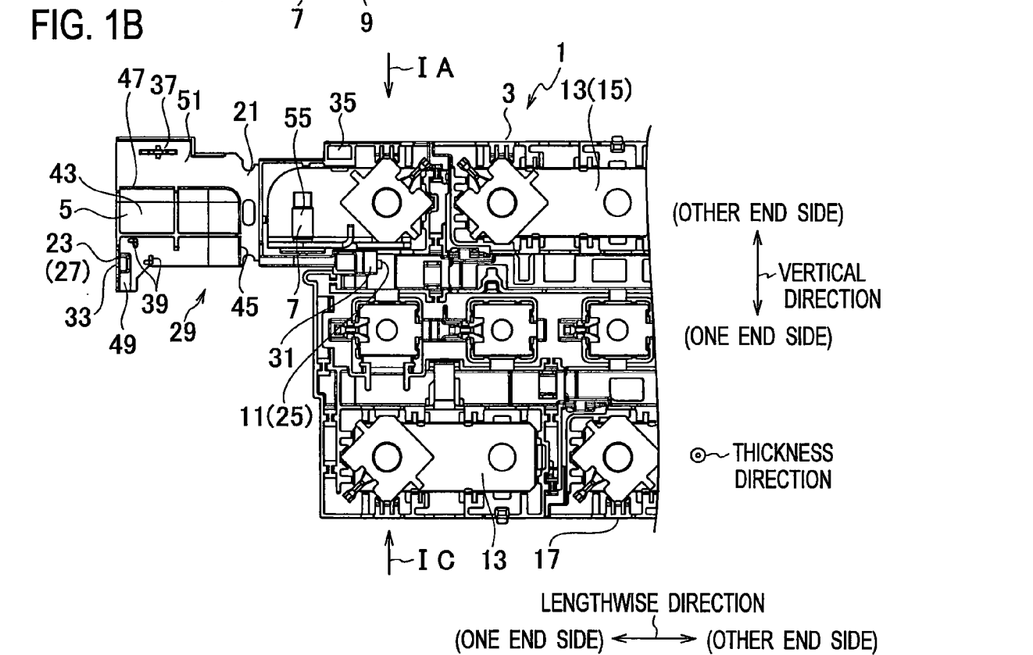
FIG. 1B is a front view of the main part.
Figure 1C:
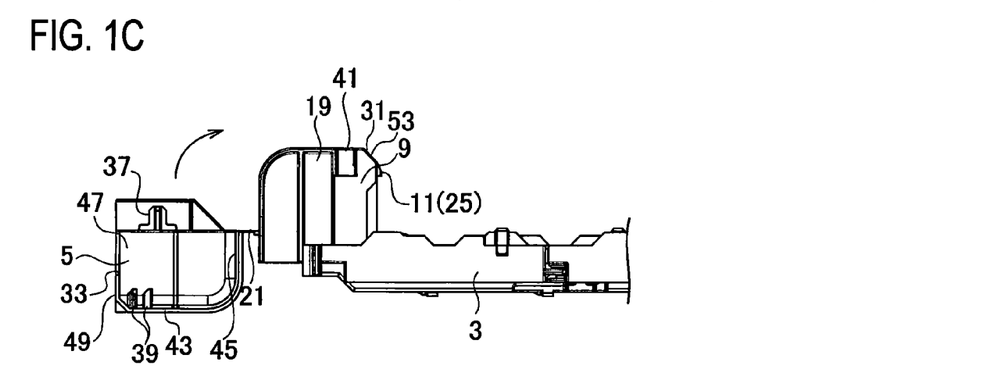
FIG. 1C is a view of the main part viewed in a IC arrow direction of FIG. 1B.
Figure 2:
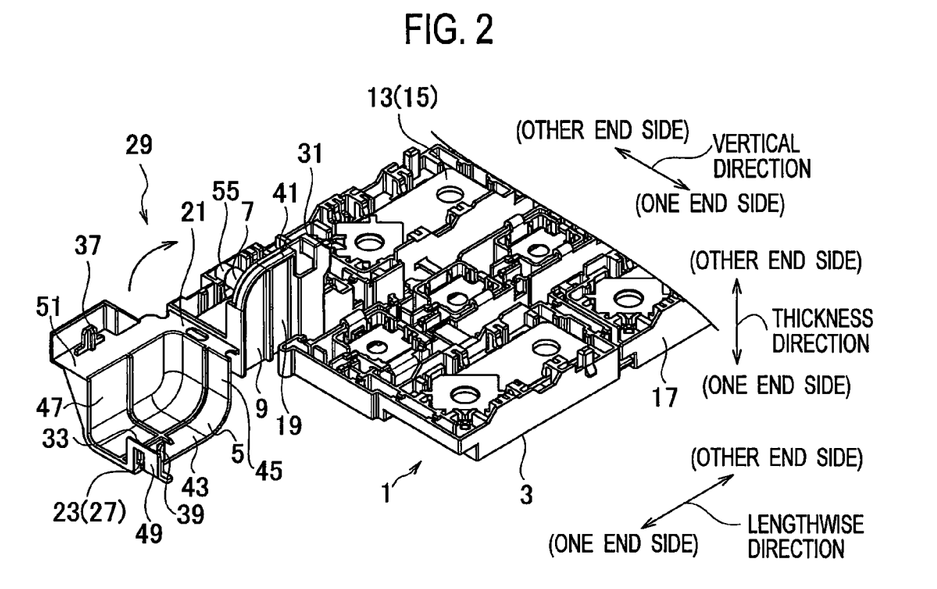
FIG. 2 is a perspective view showing the main part of the bus bar module (the bus bar module with the terminal cover opened) of the embodiment of the present invention.
Figure 3:
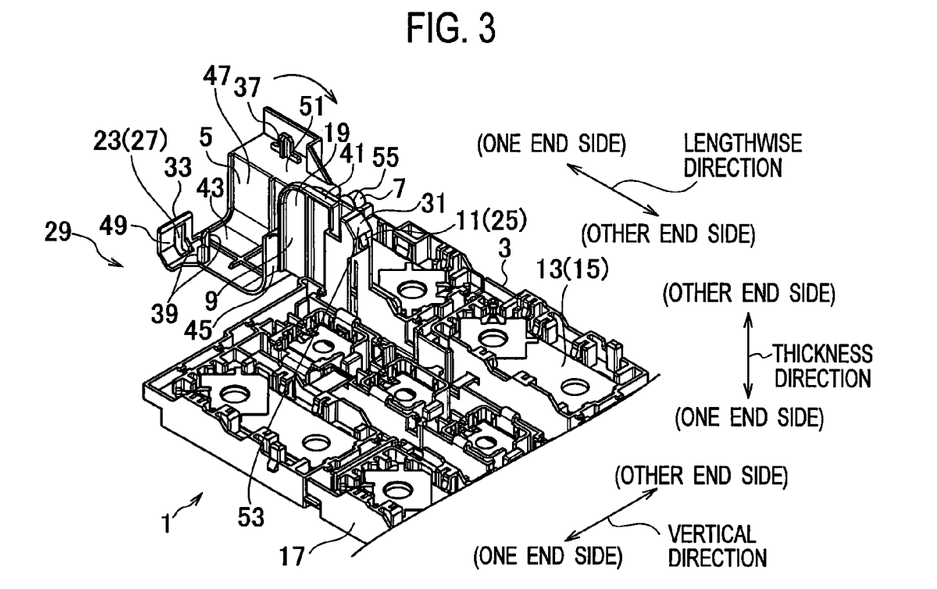
FIG. 3 is another perspective view showing the main part of the bus bar module (the bus bar module with the terminal cover opened) of the embodiment of the present invention.
Figure 4:
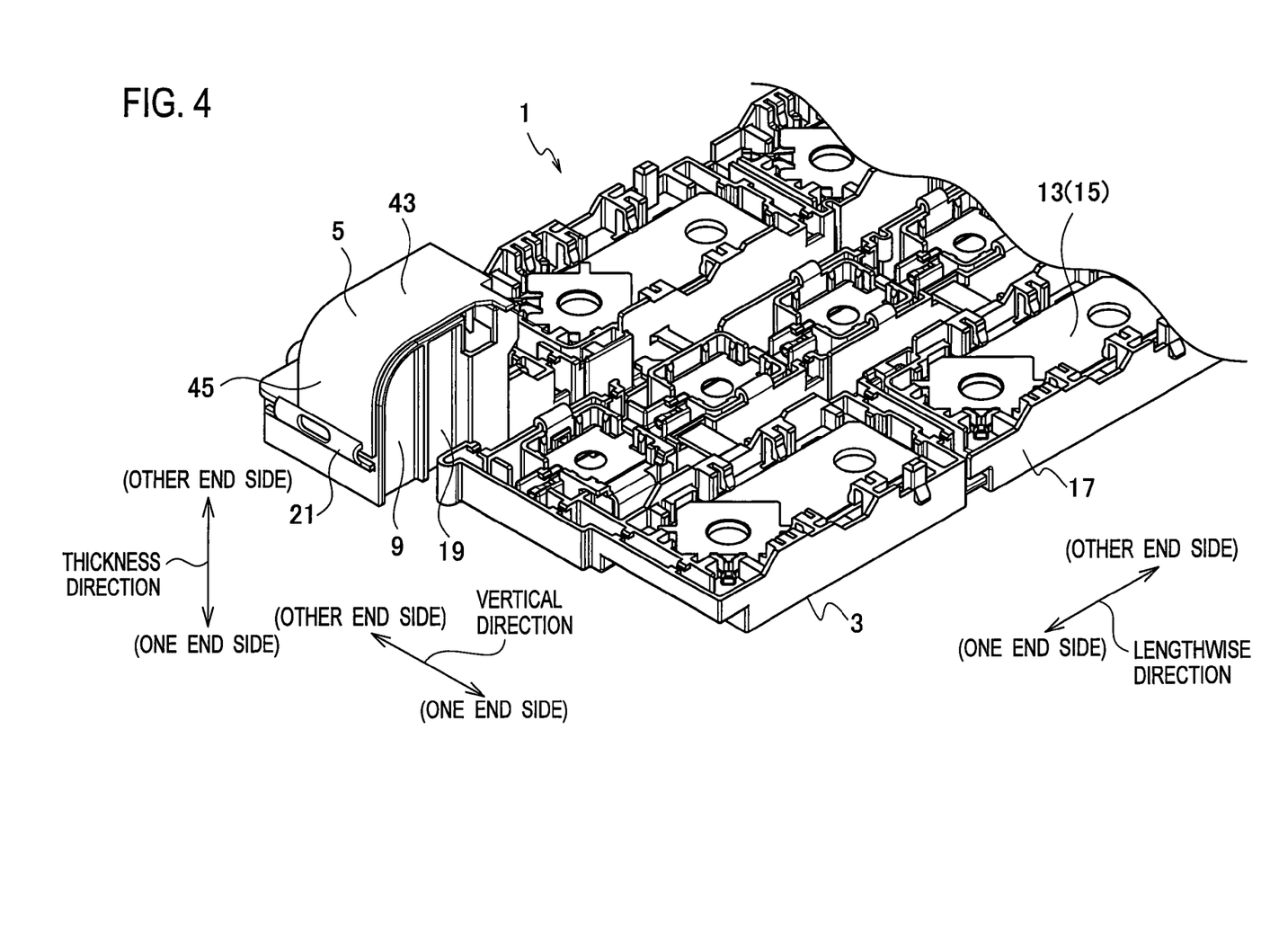
FIG. 4 is another perspective view showing the main part of the bus bar module (the bus bar module with the terminal cover closed) of the embodiment of the present invention, which is the view corresponding to FIG. 2.
Figure 5A:
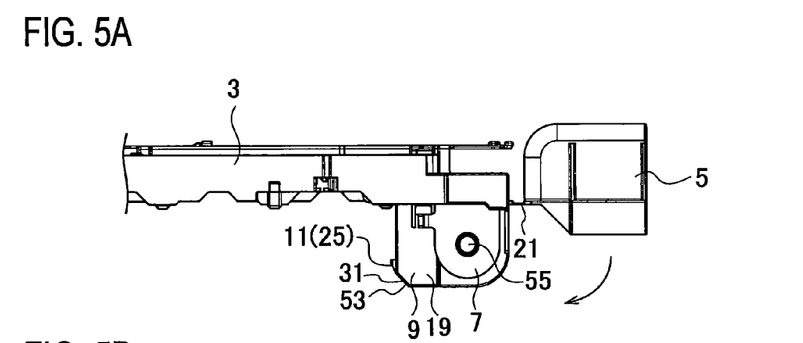
FIG. 5A is a view of the main part viewed in a VA arrow direction of FIG. 5B.
Figure 5B:
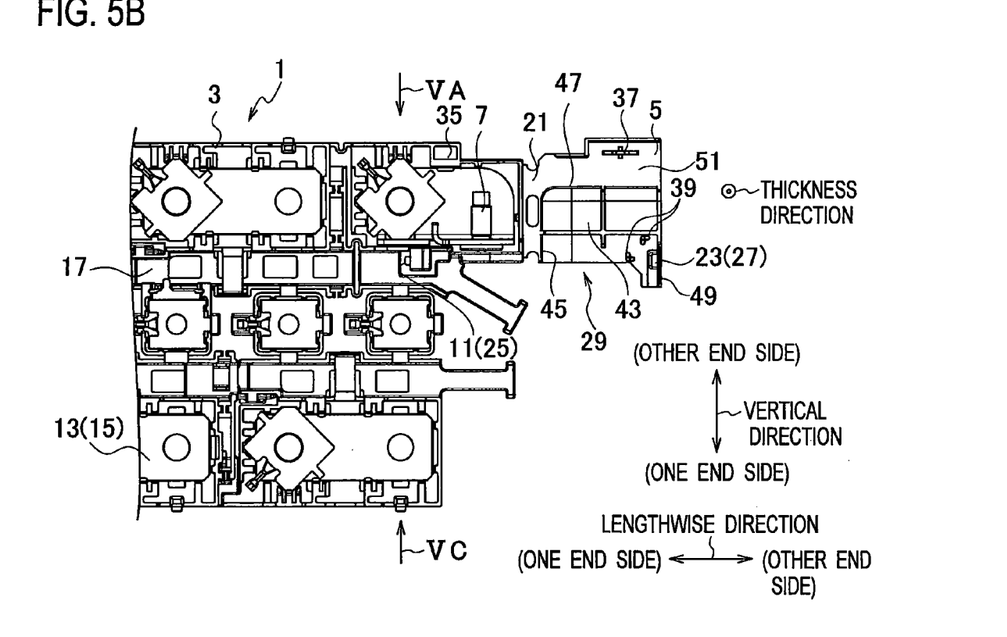
FIG. 5B is a front view of the main part.
Figure 5C:
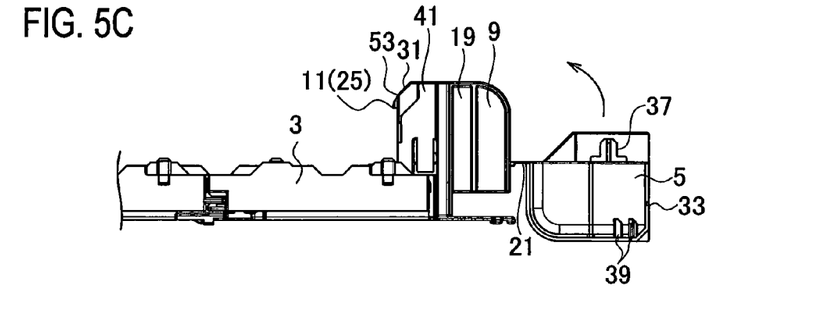
FIG. 5C is a view of the main part viewed in a VC arrow direction of FIG. 5B.
Figure 6:
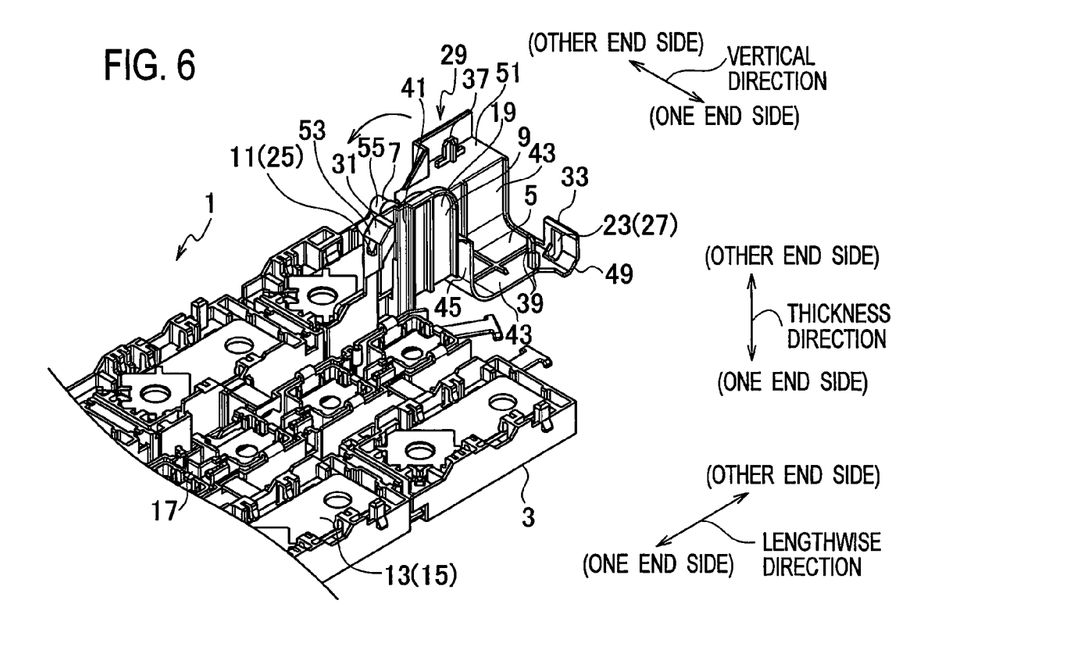
FIG. 6 is a perspective view showing the different main part of the bus bar module (the bus bar module with the terminal cover opened) of the embodiment of the present invention.
Figure 7:
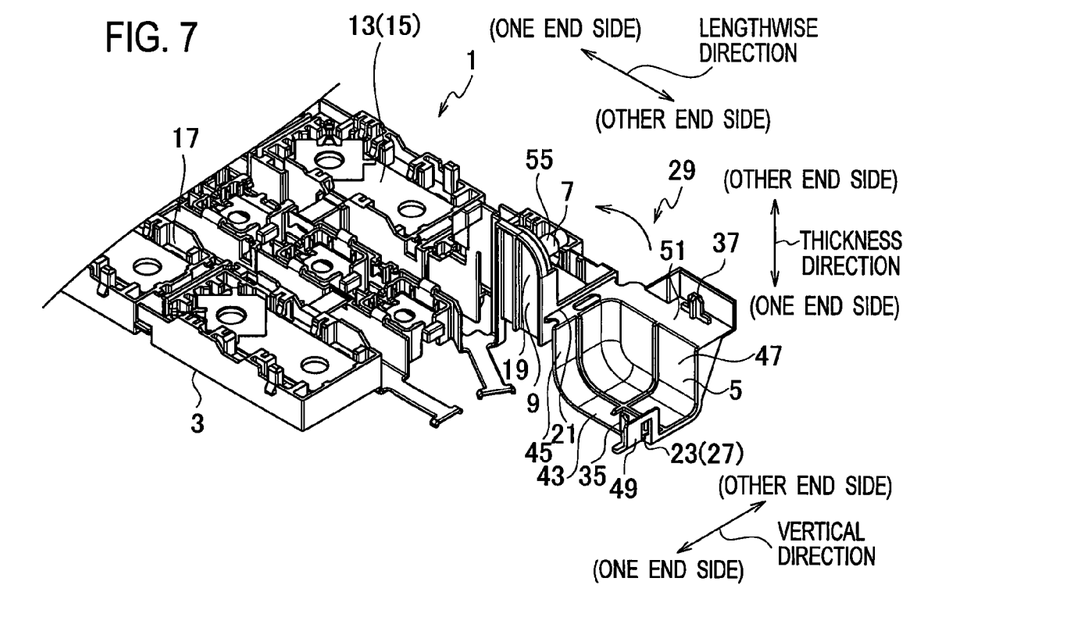
FIG. 7 is another perspective view showing the different main part of the bus bar module (the bus bar module with the terminal cover opened) of the embodiment of the present invention.
Figure 8:
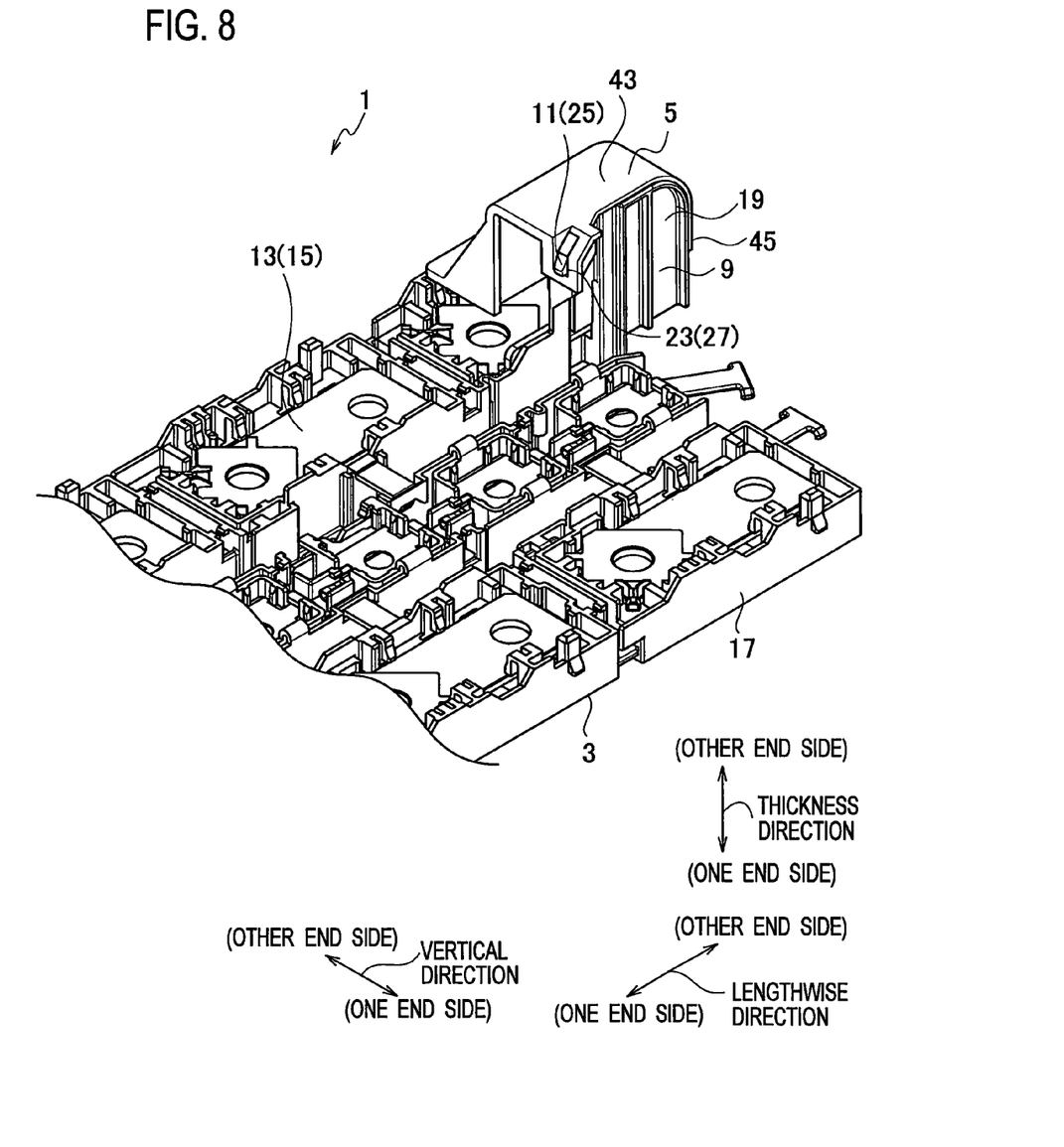
FIG. 8 is another perspective view showing the different main part of the bus bar module (the bus bar module with the terminal cover closed) of the embodiment of the present invention.
Figure 9:
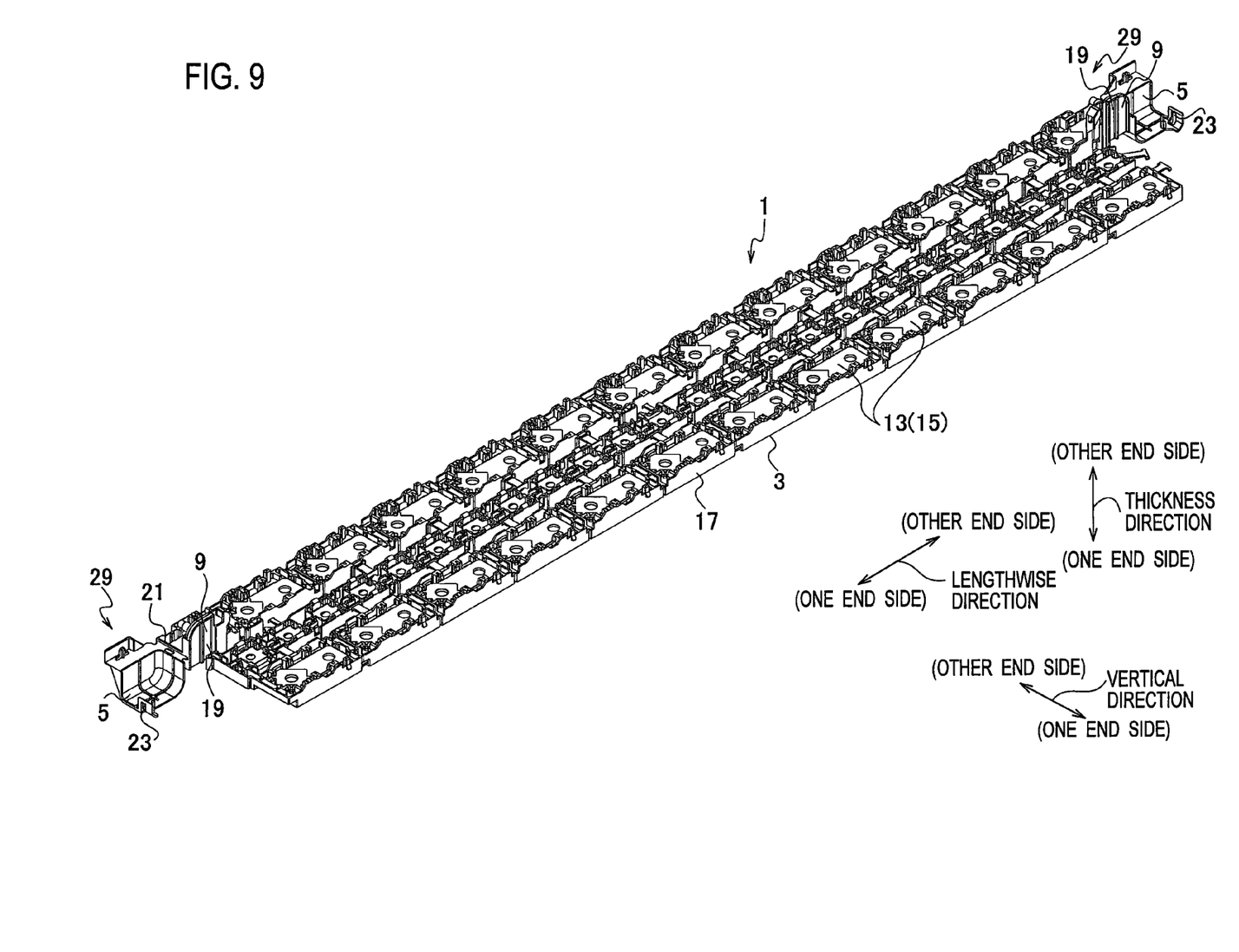
FIG. 9 is a perspective view showing the entirety of the bus bar module (the bus bar module with the terminal cover opened) of the embodiment of the present invention.
Figure 10A:
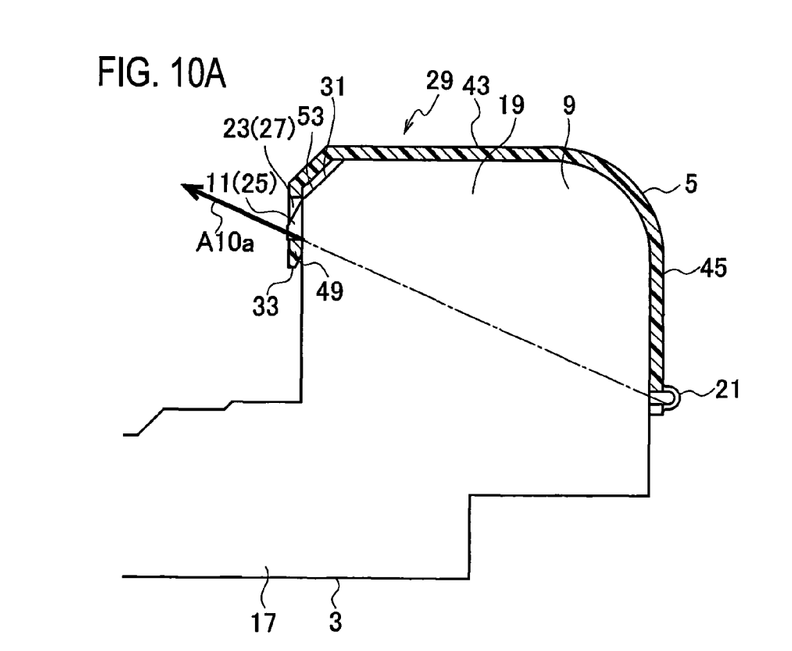
Figure 10B:
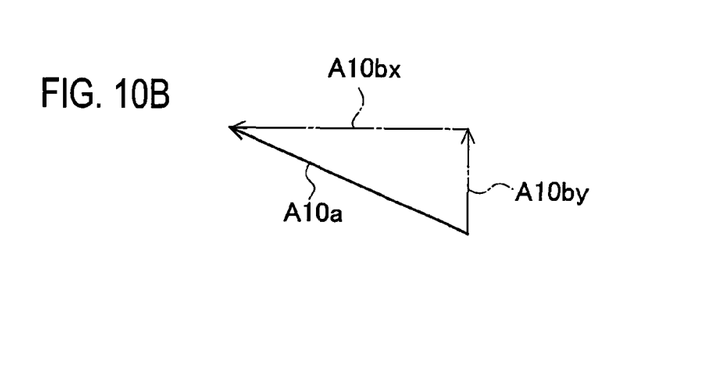

It should be noted that the output terminal cover 5 is designed not only to turn around the turn line of the hinge section 21 between the covering position and the uncovering position, but also to slightly move with the assistance of the hinge section 21, for example, in directions closer to and away from the output terminal installation section 9 (in the lengthwise direction of the bus bar module 1; in the left-right direction in FIGS. 10A and 10B). The output terminal cover 5 is further designed to slightly move with the assistance of the hinge section 21, for example, in the upward-downward direction in FIGS. 10A and 10B (in the thickness direction of the bus bar module 1).

Thereby, the alignment of the cover latch section 23 with the cover latching section 11 is achieved by the slight movement of the output terminal cover 5 under the guidance by the guide section 29 in the directions closer to and away from the output terminal installation section 9, and the like.

Citing examples, descriptions will be provided for the guide section 29.

The guide section 29 is formed in at least one of first to fourth modes shown below.

In the first mode, the guide section 29 is formed from: a guide surface 31 provided to the output terminal installation section 9; and a part 33 of the output terminal cover 5 configured to come into engagement with and to slide on the guide surface 31.

In the second mode, the guide section 29 is formed from: a recess 35 provided to the bus bar module body section 3 (the base board part 17) near the output terminal installation section 9; and a projection 37 provided to the output terminal cover 5, and configured to enter the recess 35.

In the third mode, the guide section 29 is formed from: a projection (not illustrated) provided to the bus bar module body section 3 near the output terminal installation section 9; and a recess (not illustrated) provided to the output terminal cover, and configured to receive the projection. This is the other way round from the second mode.

In the fourth mode, the guide section 29 is formed from: a pair of projections 39 provided to the output terminal cover 5 near the cover latching section 11; and a part 41 of the output terminal installation section 9 (the projection 19) to be interposed between the pair of projections 39.

Furthermore, in the bus bar module 1, the output terminal cover 5 includes a bottom wall section 43, a first side wall section 45, a second side wall section 47 and a cover latch section forming section 49.

The bottom wall section 43 is shaped like a rectangular flat plate. The first and second side wall sections 45, 47 are also shaped like a rectangular flat plate. Furthermore, the first side wall section 45 is orthogonal to the bottom wall section 43. The second side wall section 47 is orthogonal to the bottom wall section 43 and the first side wall section 45.

The cover latch section forming section 49 is shaped like a plate, and projects from the farthest corner of the bottom wall section 43 from the side wall sections 45, 47, as well as from the vicinity of the corner. The cover latch section forming section 49 is provided with the cover latch section 23.

Further descriptions will be provided for the output terminal cover 5. The output terminal cover 5 includes the three flat plate-shaped parts (the bottom wall section 43, the first side wall section 45 and the second side wall section 47) which are orthogonal to one another (the output terminal cover 5 is shaped like a rectangular box-shaped structure lacking two adjacent, flat plate-shaped side wall sections).

In other words, the output terminal cover 5 includes: the bottom wall section 43 like a rectangular flat plate; the first side wall section 45 shaped like a rectangular flat plate, and rising up from one side of the bottom wall section 43 in a way that is orthogonal to the bottom wall section 43; and the second side wall section 47 shaped like a rectangular flat plate, and rising up from another side of the bottom wall section 43 and one side of the first side wall section 45 in a way that is orthogonal to the bottom wall section 43 and the first side wall section 45.

The cover latch section forming section 49 projects from a part of yet another side of the bottom wall section (a side opposite the side by which the bottom wall section and the first side wall section 45 are joined together) in a way that is parallel to the first side wall section 45, and in the same direction as does the first side wall section 45, but with a shorter length than the first side wall section 45.

The output terminal cover 5 is provided with a flat plate-shaped part 51 shaped like a rectangle. The flat plate-shaped part 51 projects from one side of the second side wall section 47 (a side by which the second side wall section 47 and the bottom wall section 43 are joined together) in a way that is parallel to the bottom wall section 43, but in a direction away from the bottom wall section 43 and the first side wall section 45 (toward the other end of the bus bar module 1 in the vertical direction).

The hinge section 21 is formed along another side of the first side wall section 45 (a side opposite the side by which the first side wall section 45 and the bottom wall section 43 are joined together).

The output terminal 7 installed on the output terminal installation section 9 is designed to be located inside an internal space, defined by the output terminal cover 5 and the projecting part (the projection 19) of the output terminal installation section 9, when the output terminal cover 5 covers the output terminal 7 installed on the output terminal installation section 9.

To put it in more detail, while the output terminal cover 5 is located in the covering position, a rectangular box-shaped part is formed from the bottom wall section 43, the first side wall section 45 and the second side wall section 47 of the output terminal cover 5, and the installed output terminal 7 is located inside the box.

In the first mode of the guide section 29, meanwhile, the part 33 of the output terminal cover 5 is formed from a portion (a tip end portion, for example) of the cover latch section forming section 49, and the guide surface 31 is formed from an inclined surface 53 of the projection 19. The inclined surface 53 is formed by beveling one corner of the projection 19 shaped like a rectangular flat plate. The inclined surface 53 is located in a tip end-side portion of the projection 19, which is an opposite side of the projection 19 from the hinge section 21. Furthermore, the cover latching section 11 is located in a portion of the projection 19 which is near the inclined surface 53, and which is closer to the base end side (to the base board part 17) than is the inclined surface 53.

Moreover, when the output terminal cover 5 is turned from the uncovering position to the covering position, the following action occurs in a period from a state immediately before to a state where the cover latch section 23 is fastened to the cover latching section 11: the part 33 comes into contact with the inclined surface 53, the positions of the output terminal cover 5 (its positions in the thickness and lengthwise directions) are thereby corrected, and the output terminal cover 5 is guided subsequently.

In the second mode of the guide section 29, the projection 37 projects from the flat plate-shaped part 51 in the same direction as do the side wall sections 45, 47 with the height lower than those of the side wall sections 45, 47, while the recess 35 is formed in the base board part 17. Furthermore, the tip end of the projection 37 is beveled so as to facilitate insertion into the recess 35.

Moreover, when the output terminal cover 5 is turned from the uncovering position to the covering position, the following action occurs in a period from a state immediately before to a state where the cover latch section 23 is fastened to the cover latching section 11: the projection 37 enters the recess 35, the positions of the output terminal cover 5 (its positions in the vertical and lengthwise directions) are thereby corrected, and the output terminal cover 5 is guided subsequently.

Details of the third mode of the guide section 29 will be omitted, since the details are the same as those of the second mode.

In the fourth mode of the guide section 29, the pair of projections 39 located near the cover latch section forming section 49 project from the bottom wall section 43 in the same direction as do the side wall sections 45, 47 with a height lower than those of the side wall sections 45, 47. Furthermore, the pair of projections 39 is provided at an interval which is slightly larger than the thickness of the projection 19. In addition, the tip ends of the projections 39 are beveled so as to facilitate insertion of the projection 19 between the projections 39.

Furthermore, when the output terminal cover 5 is turned from the uncovering position to the covering position, the following action occurs in a period from a state immediately before to a state where the cover latch section 23 is fastened to the cover latching section 11: the part 41 (a portion of the projection 19) is inserted between the pair of projections 39 in the thickness direction, the position of the output terminal cover 5 (its position in the vertical direction) is thereby corrected, and the output terminal cover 5 is guided subsequently.

Although the foregoing descriptions have been given only of the components (the output terminal cover 5 and the like) which are provided to the one end portion of the bus bar module 1 in the lengthwise direction, the same components (the output terminal cover 5 and the like) are provided to the other end portion of the bus bar module 1 in the lengthwise direction as shown in FIGS. 5A to 9.

Here, descriptions will be provided for how to install the bus bar module 1 in the battery assembly, and the like.

First of all, the bus bar module 1 is installed in the battery assembly with the bus bars 13 and the output terminals 7 installed on the bus bar module 1, and with each output terminal cover 5 set in the uncovering position.

Subsequently, a terminal of a cable from another apparatus is connected to a male screw 55 of the output terminal 7.

Subsequently, the output terminal cover 5 is closed (is turned to the covering position from the uncovering position). Thereby, the installed output terminal 7 is covered.

In the bus bar module 1, the hinge section 21 for the output terminal cover 5 is provided on the base end side of the output terminal installation section 9 (the projection 19), and the cover latch section 23 of the output terminal cover 5 is provided on the tip end side of the output terminal installation section 9 (the projection 19) (the cover latch section 23 is offset toward the tip end of the output terminal installation section 9). This enables a finger to reach the cover latch section 23 of the output terminal cover 5 without being obstructed by the base end part 17 of the bus bar module body section 3. Accordingly, the output terminal cover 5 can be easily opened and closed. This makes it easy to maintain the installed output terminals 7 and the like in the bus bar module 1 installed in the battery assembly.

Figure 11:
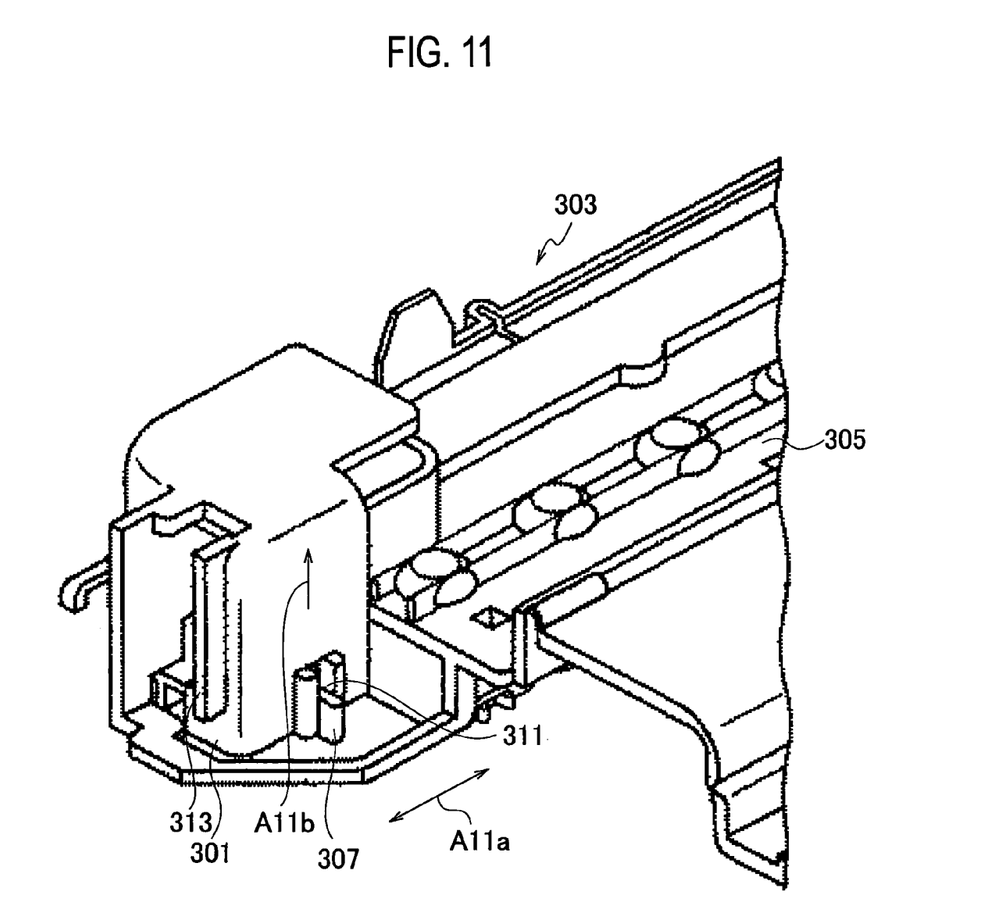
FIG. 11 is a perspective view showing the conventional bus bar module.
Figure 12:
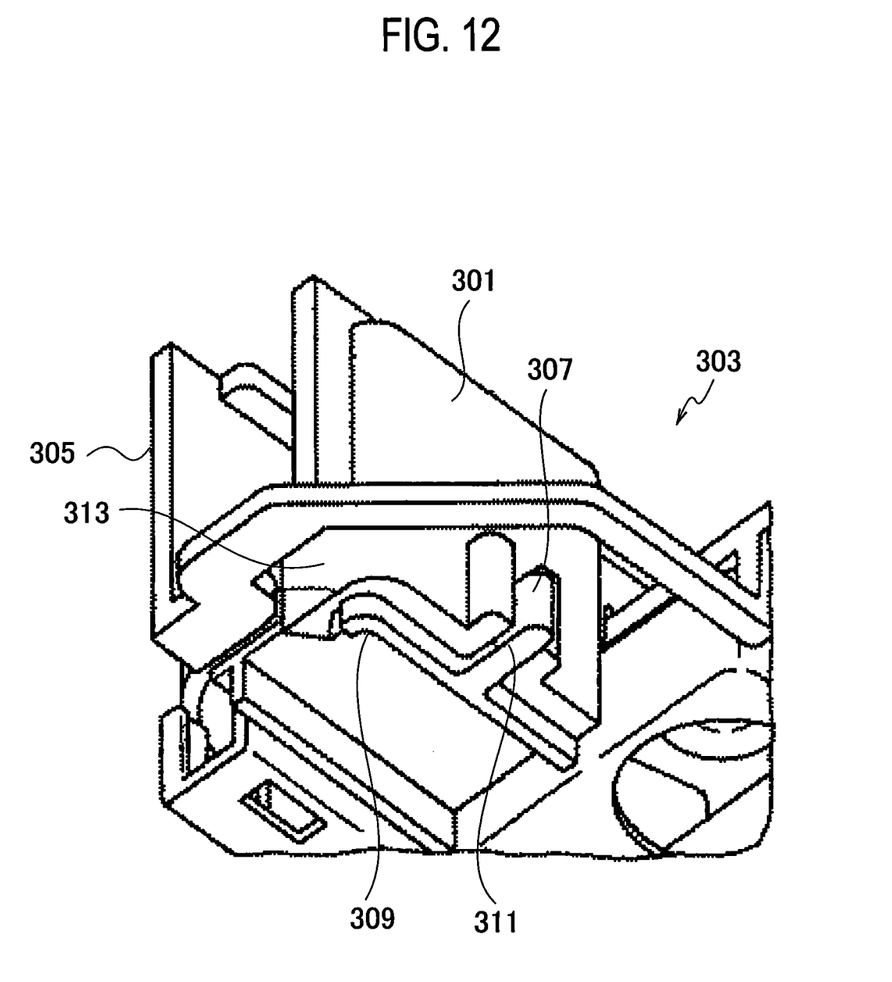
FIG. 12 is another perspective view showing the conventional bus bar module.
Figure 13:
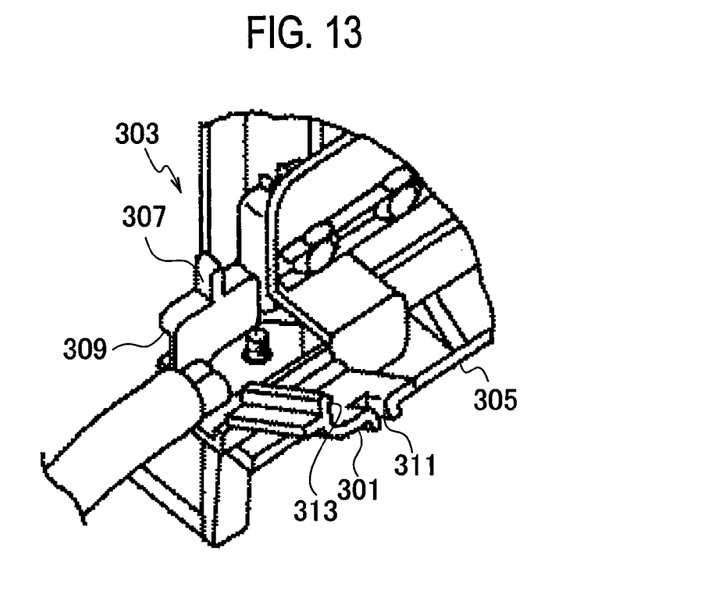
FIG. 13 is another perspective view showing the conventional bus bar module.
Figure 14:
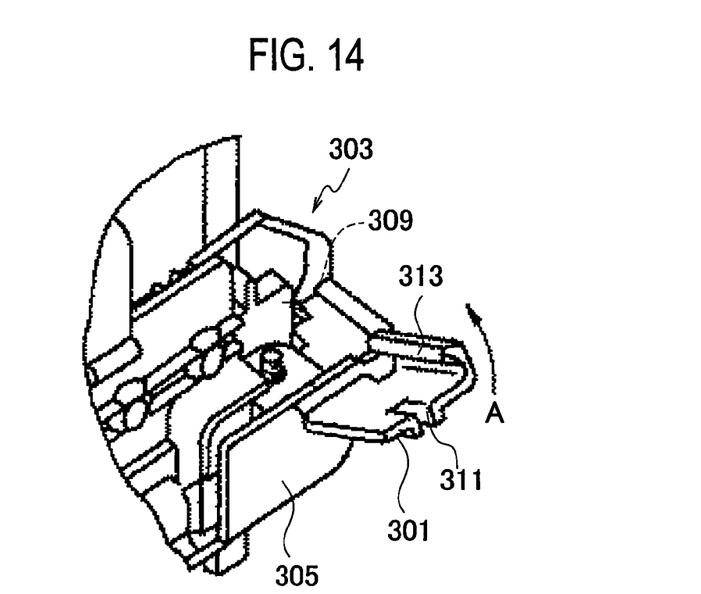
FIG. 14 is another perspective view showing the conventional bus bar module.

On the contrary, in the conventional bus bar module 303 shown in FIG. 11 and the like, the latch section (the cover latching section) and the latching claw (the cover latch section) are located at the same height as is the hinge section for the output terminal cover 301. For this reason, when the output terminal cover 301 is closed by being turned on the hinge section, the output terminal cover 301 can be positioned only in one direction (only in a direction indicated with an arrow A11a in FIG. 11) because the turning track (rotational track) of the output terminal cover 301 is obstructed in the remaining three directions. Without a structure which aligns the positions of the latch section 309 and the cover latching claw 313 with each other at the front end of the turning track (if the latch section 309 and the cover latching claw 313 are moved in a direction indicated with an arrow A11b in FIG. 11), the alignment for the lock (the alignment of the latch section 309 to the cover latching claw 313) would be difficult.

By contrast, the bus bar module 1 of the embodiment of the present invention is provided with the guide section 29. For this reason, although the cover latch section 23 is offset toward the tip end of the output terminal installation section 9, the cover latch section 23 is easily aligned with the cover latching section 11 when the output terminal cover 5 is closed.

Figure 10C:
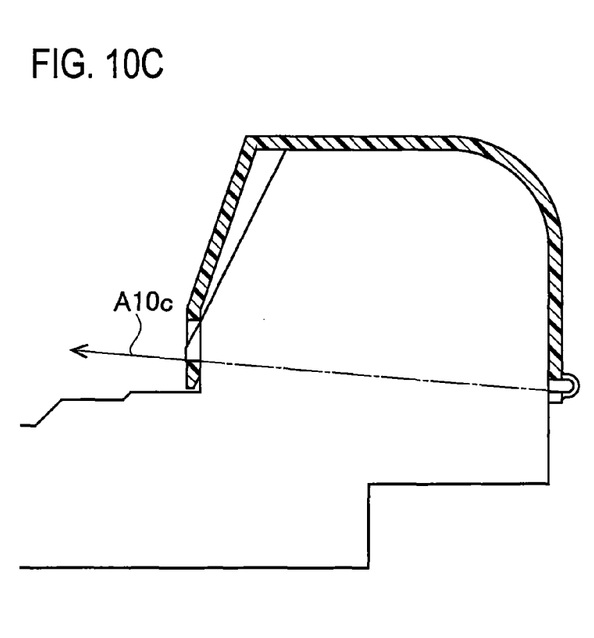
FIGS. 10C and 10D are diagrams related to a comparative example, namely a conventional bus bar module.
Figure 10D:
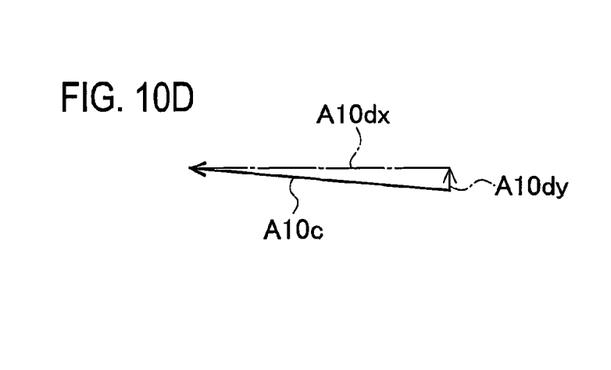

For example, if, like in the conventional bus bar module, the heights of the cover latch section and the cover latching section were almost equal to the height of the hinge section (see FIG. 10C), and if the alignment needed to be performed by an amount indicated with an arrow A10c in FIG. 10C (albeit the length of the arrow A10c is exaggerated), the position of the cover latch section would need to be adjusted by the hinge section by amounts indicated with the respective arrows A10dy, A10dx in FIG. 10D.

In this respect, in the conventional bus bar module, the hinge section and the cover latch section are located at almost the same height. For this reason, the length indicated with the arrow A10dy in FIG. 10D is smaller. This means that: when the output terminal cover is closed, the hinge section only has to correct the displacement of the output terminal cover in a direction, the left-right direction, in FIG. 10C; and accordingly, the adjustment of the position of the cover latch section is simple.

By contrast, in the bus bar module 1, the cover latch section 23 is offset upward (see FIG. 10A). When the alignment is needed by an amount indicated with an arrow A10a in FIG. 10A (albeit the length of the arrow A10a is exaggerated), the position of the cover latch section 23 needs to be adjusted by the hinge section 21 by amounts indicated with arrows A10by, A10bx in FIG. 10B.

As for the bus bar module 1, since the cover latch section 23 is offset upward, the length of the arrow A10by in FIG. 10B is relatively large. This means that: when the output terminal cover 5 is closed, the hinge section 21 has to correct the displacement of the output terminal cover 5 in directions, a left-right direction and an up-down direction, in FIG. 10A; and accordingly, the adjustment of the position of the cover latch section 23 is slightly complicated.

Since, however, the guide section 29 is formed, the position of the cover latch section 23 is easily aligned with the position of the cover latching section 11 when the output terminal cover 5 is closed, although the cover latch section 23 is offset toward the tip end of the output terminal installation section 9 (the projection 19) (although the cover latch section 23 is offset upward).

Furthermore, as for the bus bar module 1, since the cover latch section 23 is provided to the cover latch section forming section 49 which projects from the farthest corner of the bottom wall section 43 from the side wall sections 45, 47, as well as from the vicinity of the corner, the part provided with the cover latch section 23 easily undergoes elastic deformation. Accordingly, the cover latch section 23 is more easily aligned with the cover latching section 11 when the output terminal cover 5 is closed.

What is claimed is:

1. A bus bar module installed and used in a battery assembly in order to connect batteries of the battery assembly in series, comprising:
   a bus bar module body section formed of an insulating material, and including
      an output terminal installation section on which to install an output terminal, a part of the output terminal installation section projecting, and
      a cover latching section provided to a tip end side of the projecting output terminal installation section; and
   an output terminal cover configured to cover the output terminal installed on the output terminal installation section, provided to the bus bar module body section using a hinge section which is provided to a base end side of the output terminal installation section, and including a cover latch section provided to a tip end side of the output terminal cover, the cover latch section configured to be fastened to the cover latching section of the bus bar module body section when the output terminal cover covers the output terminal installed on the output terminal installation section.

2. The bus bar module according to claim 1, comprising a guide section configured to align the cover latch section of the output terminal cover with the cover latching section of the bus bar module body section when the cover latch section is fastened to the cover latching section.

3. The bus bar module according to claim 2, wherein the guide section is formed from at least one of:
   a mode including a guide surface provided to the output terminal installation section, and a part of the output terminal cover configured to come into engagement with and slide over the guide surface;
   a mode including a recess provided to the bus bar module body section near the output terminal installation section, and a projection provided to the output terminal cover and configured to enter the recess;
   a mode including a projection provided to the bus bar module body section near the output terminal installation section, and a recess provided to the output terminal cover and configured to receive entry of the projection; and
   a mode including a pair of projections provided to the output terminal cover near the cover latching section, and a part of the output terminal installation section configured to be interposed between the pair of projections.

4. The bus bar module according to claim 1, wherein
   the output terminal cover includes
      a bottom wall section shaped like a rectangular flat plate,
      a first side wall section shaped like a rectangular flat plate, and being orthogonal to the bottom wall section, a second side wall section shaped like a rectangular flat plate, and being orthogonal to the bottom wall section and the first side wall section, and a cover latch section forming section shaped like a plate, projecting from the farthest corner of the bottom wall section from the side wall sections, as well as from a vicinity of the corner, and including the cover latch section, the projecting part of the output terminal installation section is shaped like a flat plate, the hinge section is provided to one side of the first side wall section which is opposite from the bottom wall section, and the output terminal installed on the output terminal installation section is designed to be located inside an internal space defined by the output terminal cover and the projecting part of the output terminal installation section when the output terminal cover covers the output terminal installed on the output terminal installation section.

* * * * *